United States Patent [19]
Sutherland et al.

[11] Patent Number: 5,903,277
[45] Date of Patent: May 11, 1999

[54] METHOD OF RENDERING AN IMAGE

[75] Inventors: Stephen B. Sutherland, Unionville; Dale M. Wick, Brooklin; John-Paul J. Gignac, LaSalle, all of Canada

[73] Assignee: Truespectra Inc., North York, Canada

[21] Appl. No.: 08/629,543

[22] Filed: Apr. 9, 1996

[51] Int. Cl.[6] .................................................. G06F 15/00
[52] U.S. Cl. .......................................................... 345/431
[58] Field of Search .................... 364/900; 395/119–135, 395/140–143, 613–615, 431; 345/505, 419–435, 440–443

[56] References Cited

U.S. PATENT DOCUMENTS

| | | | |
|---|---|---|---|
| 4,967,392 | 10/1990 | Werner et al. | 364/900 |
| 5,307,449 | 4/1994 | Kelly et al. | 395/119 |
| 5,345,541 | 9/1994 | Kelley et al. | 395/126 |
| 5,517,603 | 5/1996 | Kelly et al. | 395/126 |
| 5,592,601 | 1/1997 | Kelly et al. | 395/143 |
| 5,664,180 | 9/1997 | Halpert et al. | 395/613 |

*Primary Examiner*—Joseph H. Feild
*Assistant Examiner*—Alford W. Kindred

[57] ABSTRACT

The present method renders scanlines of an image to an output device in a memory efficient manner. The image is defined by a number of order objects, each of which is independently stored. The procedure determines on a scanline basis the objects which influence the particular scanline and accumulates the rendering effect of the objects necessary for returning the scanline. Once a scanline is returned, the procedure is repeated. Objects are only partially rendered as required to pass on the necessary information as input for the next object. This approach maintains the independence of the objects, allows interaction of objects, allows output to high resolution output devices in a memory efficient manner, and allows each object to be reproduced at the best resolution.

22 Claims, 12 Drawing Sheets

```
This procedure initializes rendering of an image that consists of
the objects in the given list, rendered into an image of the given
resolution.  this procedure should be used in conjunction with
Render-Stage and Render-Term

Inputs:
- OBJ-LIST is the list of objects that define the picture.  Their
positions are specified in world space.  They are sorted either from
deepest to shallowest or vice versa.
- OUTPUT-RESOLUTION is the resolution of the target image
- WORLD-TO-OUTPUT is a transformation from world space to the output
box.  The output box is clearly defined in the first four lines of
the procedure.  This parameter is most likely in the form of an
affine transformation matrix.

Outputs:
- HANDLE is a handle to be passed to Render-Stage and Render-Term
- INPUT-BOX is an extended version of the output box that includes
any extra required information that is beyond the edges of the
output image.  This is necessary because lookaround objects can
sometimes pull information from outside the bounds of the image
onto the image.

Proc Render-Init(OBJ-LIST, OUTPUT-RESOLUTION, WORLD-TO-OUTPUT)

OUTPUT-BOX.top    <-- 0
    OUTPUT-BOX.left   <-- 0
    OUTPUT-BOX.bottom <-- OUTPUT-RESOLUTION.height - 1
    OUTPUT-BOX.right  <-- OUTPUT-RESOLUTION.width - 1

INPUT-BOX <-- OUTPUT-BOX

Initialize the list of objects to render
    RENDER-LIST <-- empty list

For each OBJ in OBJ-LIST (shallowest to deepest)

Calculate the object's position in output coordinates
              ## The MergeTransforms procedure concatenates the two input
              ## transforms.  OBJ.position is a mapping from object
              ## coordinates to world coordinates.  The result is a mapping
              ## from object coordinates to output coordinates.
        OBJ-TO-OUTPUT <-- MergeTransforms(WORLD-TO-OUTPUT, OBJ.position)

Calculate the object's boundbox
        BOUNDBOX <-- Calculate-BoundBox(OBJ, OBJ-TO-OUTPUT)

Clip the boundbox to the input box
              BOUNDBOX <-- ClipRectangle(BOUNDBOX, INPUT-BOX)

Make sure the object is partially visible
        If BOUNDBOX is empty, Goto next_obj REGN-LOOKAROUND <-- OBJ.region.Lookaround-Distance()
        TOOL-LOOKAROUND <-- OBJ.tool.Lookaround-Distance()
        NODE.y <-- BOUNDBOX.top
```

FIGURE 7 (cont)

```
Calculate the object lookaround as the maximum of the two
LOOKAROUND.left   <-- Max(REGN-LOOKAROUND.left, TOOL-LOOKAROUND.left)
LOOKAROUND.down   <-- Max(REGN-LOOKAROUND.down, TOOL-LOOKAROUND.down)
LOOKAROUND.right  <-- Max(REGN-LOOKAROUND.right, TOOL-LOOKAROUND.right)
LOOKAROUND.up     <-- Max(REGN-LOOKAROUND.up, TOOL-LOOKAROUND.up)

Insert this object's information into the render list
NODE <-- (OBJ, OBJ-TO-OUTPUT, BOUNDBOX, LOOKAROUND)
Insert-Node(RENDER-LIST, NODE)

If the object reaches off the edges of the current input-box,
extend the input box appropriately.
If BOUNDBOX.left - LOOKAROUND.left < INPUT-BOX.left Then
    INPUT-BOX.left <-- BOUNDBOX.left - LOOKAROUND.left
If BOUNDBOX.right + LOOKAROUND.right > INPUT-BOX.right Then
    INPUT-BOX.right <-- BOUNDBOX.right + LOOKAROUND.right
If BOUNDBOX.top - LOOKAROUND.up < INPUT-BOX.top Then
    INPUT-BOX.top <-- BOUNDBOX.top - LOOKAROUND.up
If BOUNDBOX.bot + LOOKAROUND.down > INPUT-BOX.bot Then
    INPUT-BOX.bot <-- BOUNDBOX.bot + LOOKAROUND.down next_obj:
    EndFor NEXT-INPUT-SCANLINE <-- INPUT-BOX.top

HANDLE <-- (NEXT-INPUT-SCANLINE, RENDER-LIST)

Return the handle and the required range of input scanlines
    Return (HANDLE, INPUT-BOX)
EndProc
```

FIGURE 8

```
This procedure executes a single stage it should be called once for
each input scanline. That is, if INPUT-BOX is the box returned by
Render-Init, then there are to be INPUT-BOX.height stages.

Note that only OUTPUT-RESOLUTION.height scanlines will be returned.
There is no guarantee that they will be returned with any sort of
regularity.  Any number of scanlines may be returned at the end of
any stage.

Inputs:
- HANDLE is the handle returned by Render-Init.
- INPUT-SCANLINE is the next scanline of the background image
onto that rendering should occur.  This scanline is usually
blank.

Outputs:
- Y is the number of the most recently completed scanline.  Here,
0 is the topmost scanline of the output image.

Proc Render-Stage(HANDLE, INPUT-SCANLINE)

Y <-- NEXT-INPUT-SCANLINE
    NEXT-INPUT-SCANLINE <-- NEXT-INPUT-SCANLINE - 1

Store the input scanline for easy reference
    HANDLE.scanline(Y) <-- BUFFER For each NODE in HANDLE.render-list (deepest to shallowest)

What is the top scanline that this object inspects?
        ABOVE <-- NODE.boundbox.top - NODE.lookaround.up

If we haven't yet reached the object, skip it
        If Y < ABOVE, Goto next_obj

Calculate how many scanlines this object can now render.
        ## The scanlines that can be rendered immediately are numbered
        ## from Y to DOWNTO.
        If Y >= NODE.boundbox.top &
           Y < NODE.boundbox.bottom + NODE.lookaround.down Then

The object is currently stalled

If Y < NODE.boundbox.top + NODE.lookaround.down Then
                   ## It is still waiting for lookahead scanlines
                   DOWNTO <-- NODE.boundbox.top - 1
               Else
                   ## It can render one scanline
                   DOWNTO <-- Y - NODE.lookaround.down
               EndIf
        Else
               ## There is no stall
               DOWNTO <-- Y
        EndIf
```

FIGURE 8 (cont)

```
Render this object's scanlines numbered from Y through DOWNTO
        ## This is as many scanlines as the object can possibly render
        ## until the next stage.
    For N from NODE.y to DOWNTO

Buffer the current scanline
        Copy-Scanline(NODE.buffer(N), HANDLE.scanline(N))

If we're on the object's first scanline, initialize
        ## the region and tool
        If N = NODE.boundbox.top Then OBJECT-SIZE = NODE.boundbox.size NODE.region.Init(OBJECT-SIZE, NODE.obj-to-output)
            NODE.tool.Init(OBJECT-SIZE, NODE.obj-to-output)
        EndIf

Render a scanline of the region into a temporary buffer
        TEMP_BUF <-- NODE.region.Scanline(NODE.buffers, HANDLE.scanlines)

Render a scanline of the tool using the region's output
        ## as a translucency filter.  The result is stored in
        ## HANDLE.scanline(N)
        NODE.tool.Scanline(NODE.buffers, HANDLE.scanlines, TEMP_BUF)

If we're on the last scanline, terminate the region and
        ## tool and remove the node from the render list
        If N = NODE.boundbox.bot Then NODE.tool.Terminate()
            NODE.region.Terminate()

Remove-Node(HANDLE.render-list, NODE)
        EndIf
    EndFor
    NODE.y <-- DOWNTO + 1
    Y <-- DOWNTO
next_obj:
    EndFor

Return the number of the bottom-most completed scanline
    Return Y
EndProc
```

FIGURE 9

```
This procedure marks the end of rendering.  It should be called after
the entire image has been rendered.

Inputs:
- HANDLE is the handle returned by Render-Init.

Outputs:
none

Proc RenderTerm(HANDLE)
    Free all allocated resources
EndProc
```

FIGURE 10

```
Using the Render Engine
This procedure is a demonstration of how the Render-Init, Render-Stage
and Render-Term functions are used.

Inputs:
- OBJ-LIST, OUTPUT-RESOLUTION, WORLD-TO-OUTPUT are the same as in
Render-Init.
- DEVICE is the device to send the output image to.  Ideally, it
is a scanline-based device like a printer or a monitor.  It can
also be a logical device like a pipe or a redirection.
Proc Render-Image(OBJ-LIST, OUTPUT-RESOLUTION, WORLD-TO-OUTPUT, DEVICE)

Initialize the engine
    (HANDLE, INPUT-BOX) <--
        Render-Init(OBJ-LIST, OUTPUT-RESOLUTION, WORLD-TO-OUTPUT)

We need to provide scanlines numbered from INPUT-BOX.top
    ## through INPUT-BOX.bottom.
        TOP <-- INPUT-BOX.top
        BOTTOM <-- INPUT-BOX.bottom

P represents the next scanline to send to the output device
    P <-- 0

For Y from TOP to BOTTOM
        ## Create a new blank scanline with the appropriate width
        SCANLINE(Y) <-- new scanline(INPUT-BOX.width)

DOWNTO <-- Render-Stage(HANDLE, SCANLINE(Y))

Send any new scanlines to the output device
        For N from P to DOWNTO
            Output(DEVICE, SCANLINE(N))
        Endfor
            P <-- DOWNTO + 1

EndFor

Clean up
        Render-Term( HANDLE)

EndProc
```

METHOD OF RENDERING AN IMAGE

FIELD OF THE INVENTION

The present invention relates to a method for defining various objects which make up an image and a method of rendering the image supporting object interaction. This invention is particularly useful for computer rendering scanlines of an image to an output device.

BACKGROUND OF THE INVENTION

There are a number of computer graphic programs which store various objects and use these objects to render the final image. Generally, these computer programs can be divided into vector based graphic programs or bitmap based programs. COREL DRAW™ is primarily vector based whereas PHOTOSHOP™ is essentially bitmap based. These known graphic packages allocate enough temporary storage for the entire rendered image and then render each object, one by one, into that temporary storage. This approach fully renders lower objects prior to rendering upper objects. The programs require substantial memory in rendering the final image. Some programs use layers to allow flexibility in changing the final image, however, each layer is effectively a duplicate bitmap the resolution of the original base bitmap. Layers add flexibility in changing the design or returning to an earlier design, but substantial additional memory is required.

The final image of graphic packages is typically sent to a raster device for output, which renders the image on a scanline by scanline basis. The final image is defined by a host of scanlines, each representing one row of the bitmap image. Raster devices include printers, computer screens, television screens, etc.

Vector based graphic programs, such as COREL DRAW™, produce a bitmap of the final image for the raster device. Similarly, the graphic program PHOTOSHOP™ produces a bitmap of the final image.

Vector based drawings tend to use little storage before rendering, as simple descriptions often produce largely significant results. Vector drawings are usually resolution independent and they are typically made up of a list of objects, described by a programming language or by some other symbolic representation. Bitmap images, in contrast, are a rectangular array of pixels wherein each pixel has an associated colour or grey level. This type of image has a clearly defined resolution (the size of the array). Each horizontal row of pixels of the bitmap is called a scanline. Bitmaps tend to use a great deal of storage, but they are easy to work with because they have few properties.

There remains a need to provide an improved method of defining an image and the interaction of its components as well as a better procedure for rendering an image to various output devices at various resolutions.

SUMMARY OF THE INVENTION

The present invention is directed to a method of rendering scanlines of an image to an output device in an efficient manner. The image is defined by a plurality of separate and distinct ordered objects and the scanlines of the image are produced by accumulating the combined rendering effect of portions of the objects in the order of the objects on each scanline. If an object does not affect the particular scanline, the object need not be considered in rendering of that scanline. The method comprises defining each object to allow determination of the rendering effect of the object by a render engine on the scanlines of the image and in manner to allow determination of the portion of each object required for returning any particular scanline of the image, analysing the objects to determine the portions thereof necessary for rendering each scanline and repeatedly using the render engine to sequentially return the scanlines of the image. Each scanline of the image is returned by the render engine after accumulating the net rendering effect of the portions of the objects associated with the particular scanline in the order of the objects.

In the case of an image made up of one to one objects, each object only needs the specific output of objects therebelow relative to the particular scanline to render its effect. Other images will include "look around" objects which require not only the direct accumulated effect of lower objects on the scanline, but also either earlier and/or future effects of adjacent stages from lower objects. The method retains this additional information to allow each object to output the necessary result for objects located thereabove to render the particular scanline. It is preferred that the objects recognize what scanlines the objects affect and that each object retains its own copy of additional information it needs to output its effect to the next object on a scanline basis. Once the information is no longer required, it can be dropped from storage which the object has maintained for holding of this information. This method for a given scanline processes the necessary portions of the objects for rendering of that scanline. The scanlines of the image are produced in a series of stages where each stage involves consulting with the various objects to accumulate the rendering effect of portions of the objects which affect the particular scanline. The objects are only rendered in their entirety if the next highest object requires that input of the lower object before it can produce a scanline. Any information stored in buffers or in another manner that is not required for rendering of future scanlines can be deleted once the scanline has been returned. This provides improved memory efficiency and allows scanlines to be outputted sooner.

According to a preferred aspect of the invention, each object is separately maintained in storage and has its own resolution or an unlimited resolution where possible determined when the object is initially defined. The rendering effect of each object is at the best resolution for imparting the rendering effect of the object to each segment of the scanline which the object affects. For example, an object may only affect a middle segment of the scanline and the best resolution of the object for this segment of the scanline is used.

According to a further aspect of the invention, each object maintains its own resolution which is used by the method at a time of rendering the image. The image is rendered to an output device which will have its own specified resolution. The best resolution of the object for the particular output device is therefore achieved. In this way, the objects are basically maintained as resolution independent objects and the actual resolution will depend upon the segment of the scanlines affected and the resolution of the output device.

From the above, it can be appreciated that the present method includes logic for analysing the objects to determine whether they affect a particular scanline and then have each of the objects output the required information for returning that particular scanline. This may require some objects to have information about the partial results provided thereto from earlier stages or later stages of the final image. Each object is only fully rendered if this is required by upper objects to allow them to return a scanline after building any required portions of lower objects. In most cases, scanlines of the image are each returned in distinct stages, where each stage involves consulting each object and having each object render only a portion of its information, which information allows that particular scanline to be returned.

BRIEF DESCRIPTION OF THE DRAWINGS

Preferred embodiments of the invention are shown in the drawings, wherein:

FIGS. 7 through 10 show pseudo code illustrating the steps performed in rendering an image to an output device.

DETAILED DESCRIPTION OF THE PREFERRED EMBODIMENTS

Figure 1:
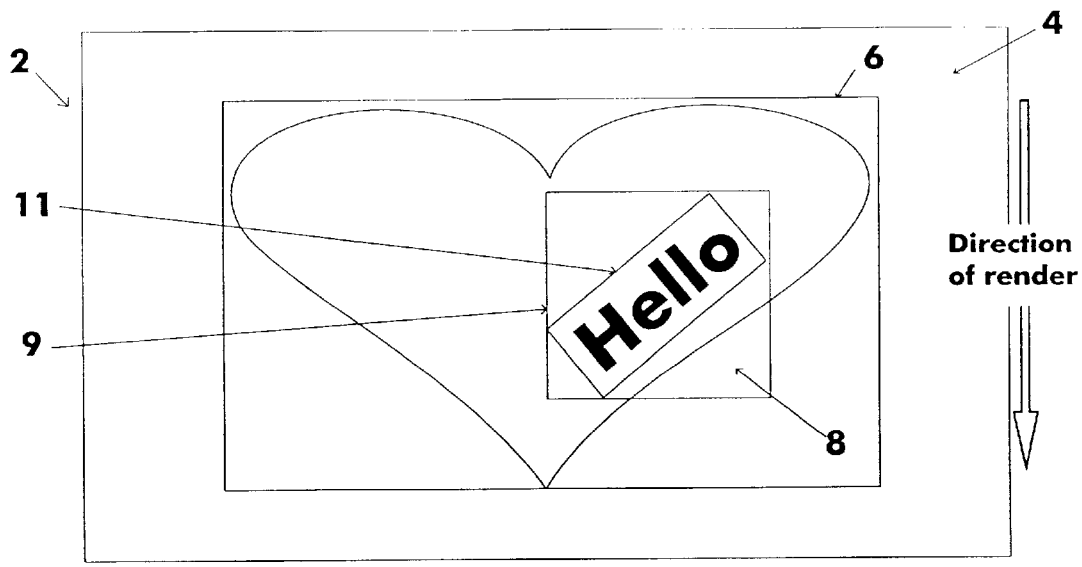
FIG. 1 is a depiction of a rendered simple image.

FIG. 1 shows an image 2, which is the collective rendering effect of the initial background 4, the lowest object 6 (heart), followed by the upper object 8 (greeting). The background 4 is easily defined and merely establishes the base to which the objects are applied. The background provides the input for the lowest object. Each of the objects 6 and 8 are separately defined and form part of the object list 10 shown in FIG. 3. The background provides initial input information used during rendering of the scanlines. This object list expands as additional objects are added and the objects are maintained in an order, based on their effect from a lowest object to an upper object. The upper object is the last object to be applied.

Figure 2:
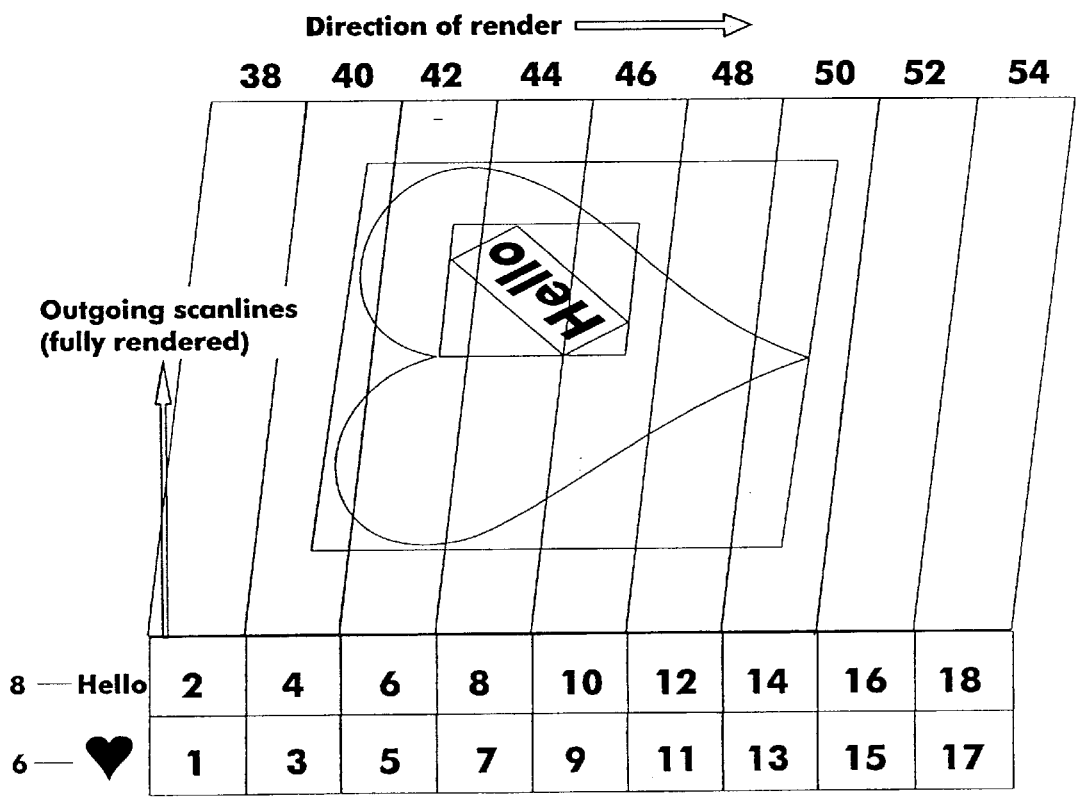
FIG. 2 is a depiction showing how various objects are used by a render engine to produce the scanlines making up the image of FIG. 1.
Figure 3:
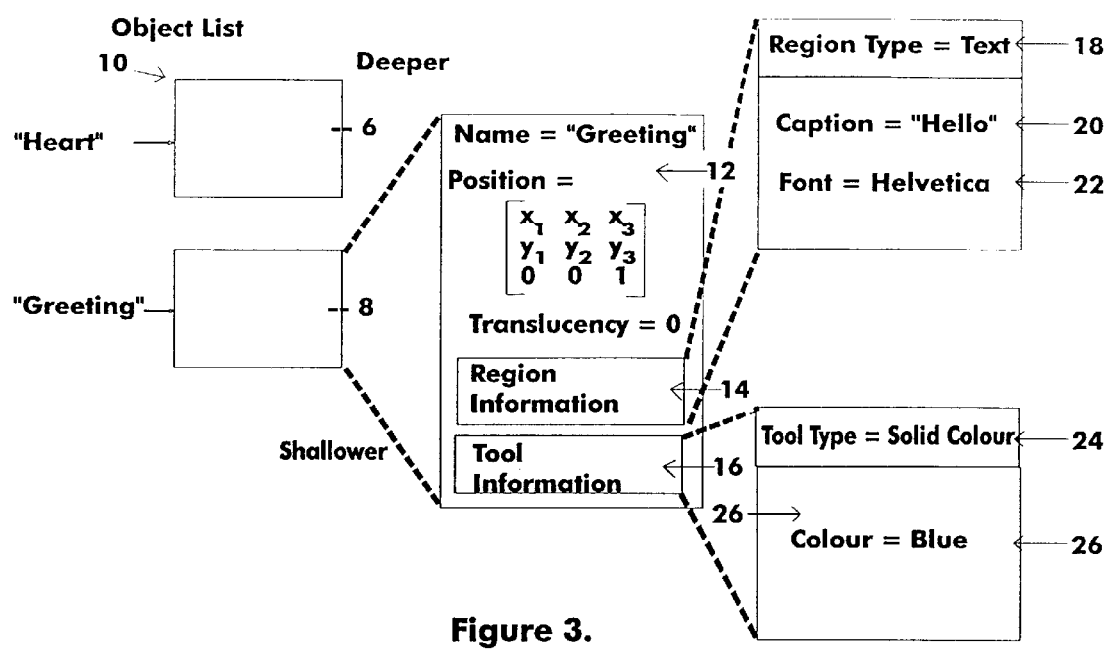
FIG. 3 illustrates the list of objects and how each object is defined.

Each of the objects shown in FIGS. 1 and 2 are defined in a manner to position the object in the final image and to allow the object to be used by a render engine to render scanlines of the image. As shown in FIG. 3, each of the objects is defined by means of general information 12, region information 14 and tool information 16. For object 8, general information 12 includes the label "Greeting" and various position coordinates as well as the degree of translucency specified for the overall object.

The region information for object 8 has been defined at 18 which specifies the actual text, "HELLO", indicated at 20, as well as the font indicated at 22.

The tool information 16 defines a tool type, in this case "solid colour" indicated at 24, as well as the specific colour "BLUE" indicated at 26.

Each of the objects have their own particular resolution determined at the time of entering or creating the object. In the case of object 8, the resolution is unlimited since the region information would be defined in terms of a series of arcs and the tool as a simple solid colour fill. The actual resolution of each object in the final image is dictated by the output device which produces the scanlines and the size of the object within the final image. The best resolution for each object is used.

Defining objects as regions and tools allows ease of expansion, as any new tool can be paired with any existing region and any new region can be paired with the existing tools.

There are three distinct coordinate systems which are used in the present method and procedures, namely world coordinates, object coordinates and output coordinates. World coordinates are the space in which object positions are specified. There is no fixed connection between world coordinates and, for instance, any particular output device coordinates. Object coordinates define a local coordinate system within each object and range from −1 to 1 in each dimension. Output coordinates are used to specify positions in the output image. They are usually measured in pixels relative to some corner of the image at output resolution and vary with different output devices.

As described above, each object consists of a region and a tool. Each object's position is represented by an affine transformation matrix which maps points from object coordinates into world coordinates. The effect of the object is restricted to the parallelogram which is the image of the object rectangle mapped into world coordinates. The object rectangle has an area which spans the object coordinates. In FIG. 1, rectangle 9 indicates the boundaries where object 8 can affect a scanline of the final image. The object rectangle 11 has been mapped into world coordinates. The scanlines of the final image affected by an object are determined at initialization of the procedure to simplify the decision process in determining whether a particular object affects a particular scanline about to be rendered.

The object region controls the affected area of the overall image. The simplest region is the rectangle region. The text region is a particularly useful example. It allows any text string to be specified and restricts the tool's effect to the shape of the specified string.

Rectangle and text are both examples of regions which at any point of the rendering of the region are either completely opaque or completely transparent. Regions are more general than this, in that they may specify a translucency level for each point of the drawing. For example, in the case of an ellipse fade region, the tool would be completely opaque in the object's center, but become more translucent towards the edges of the object.

When an object is rendered, most of the work is performed by its region and tool. The region effectively renders a greyscale bitmap for the tool to examine. The tool then uses that image as a mask and renders its own effect directly onto the destination bitmap proportional to the density of the region, and adjusted for the translucency of the object. As will be more fully described, this is done on a scanline by scanline basis.

A bitmap, such as a digitized photograph, to be used to define an object, is stored in memory and used by a bitmap tool. The region for this object is normally the rectangle and the bitmap tool transforms the bitmap to fit the rectangle. The region need not be a rectangle, for example it could be heart-shaped, effectively clipping the bitmap to that shape. Bitmaps are processed through the bitmap tool.

FIGS. 1 and 3 have illustrated the concept that the image 2, comprises a background 4, the "heart" object 6 and "greeting" object 8. Each object is separately maintained as part of the internal list of objects 10 and each has its own required information which allows it to be rendered on a scanline by scanline basis and then to be positioned within the final image. The objects are ordered to define a relative depth within the image and the image will be rendered from the deepest object to the shallowest object. To render the image of FIG. 1, the objects are partially rendered in depth order and the engine actually renders any required portions of the objects effectively simultaneously in rendering a scanline. This process is repeated for each scanline. In most cases, the objects are only partially rendered to define a scanline of the final image.

Scanline ordering has the advantage that, typically, only a few scanlines of the destination image must be in memory at any particular moment. Whenever a scanline has been completely rendered, it can be immediately sent to the output device and then freed from storage.

The render engine operates in stages. Each stage consists of a loop through the object list from deepest to shallowest. For each object, the engine calculates the number of scanlines which can be rendered with the available information and renders those. FIG. 2 illustrates the process of rendering the drawing in FIG. 1. Rendering begins at scanline 38, which is the first scanline of the image and proceeds towards the bottom of the drawing. In the first stage, scanline 38 is created. The first scanline from the background object does not intersect with the "heart" object 6 or the "greeting" object 8. For this reason, the first scanline can be rendered. The background then produces the input 40 for the next scanline. It can be seen that "heart" object 6 does affect this scanline. The scanline from the background is provided to object 6 to allow it to render itself to the appropriate portion indicated by step 3. "Greeting" object 8 has no effect on the scanline (step 4), and therefore, scanline 40 can be rendered in the final image.

In stage 3, scanline 42 is created. Both of the objects 6 and 8 will affect this scanline. Again, the process starts by the background providing input for the deepest object affected, in this case, object 6. Object 6 then renders whatever portion of the scanline it affects into the scanline (step 5) and passes the result to the next upper object, namely object 8. Object 8 then takes the required input from that scanline and uses it for rendering into the relevant portion of the scanline, step 6. Once again, the scanline of the final image can be rendered, but note that in this case the text region of object 8 does not in fact intercept scanline 42, and thus, object 8 will have no effect on this particular scanline. This process repeats itself for rendering scanlines 44, 46, 48, 50, 52 and 54.

A shaded box indicates that the object does not affect the output whereas a non-shaded box indicates the object affects the scanline of the image.

FIG. 1 is a very simple image where each scanline of the final image is determined based on the two one to one objects and there is no requirement for additional object information of "adjacent" scanlines. One to one objects merely require the net effect of the objects below on the given scanline to render their effect. Not all objects are one to one and some are referred to as "look around" objects. A "look around" object requires multiple scanlines to allow the effect of the object to be determined. An example of a "look around" object would be an object which includes blur, a wave or other specific effect. It should be noted that either the region or the tool may require this "look around" feature and if either the region or the tool is considered to be "look around", the object is a "look around" object.

Most graphic images are more complicated than FIG. 1 and involve "look around" objects requiring additional information before they can be rendered. To overcome this problem, the prior art has rendered each object in its entirety and then passed that complete information onto the next highest ranked object so that all information is available, as all lower objects have been fully rendered. This suffers from very significant problems with respect to the size of memory required to store the necessary information.

In contradiction to this approach, the present system renders the image in a number of distinct stages where the stages do not require all of the lower objects to be fully rendered and, in fact, only portions of the objects are typically rendered. This will be explained with respect to FIG. 4.

Figure 4:
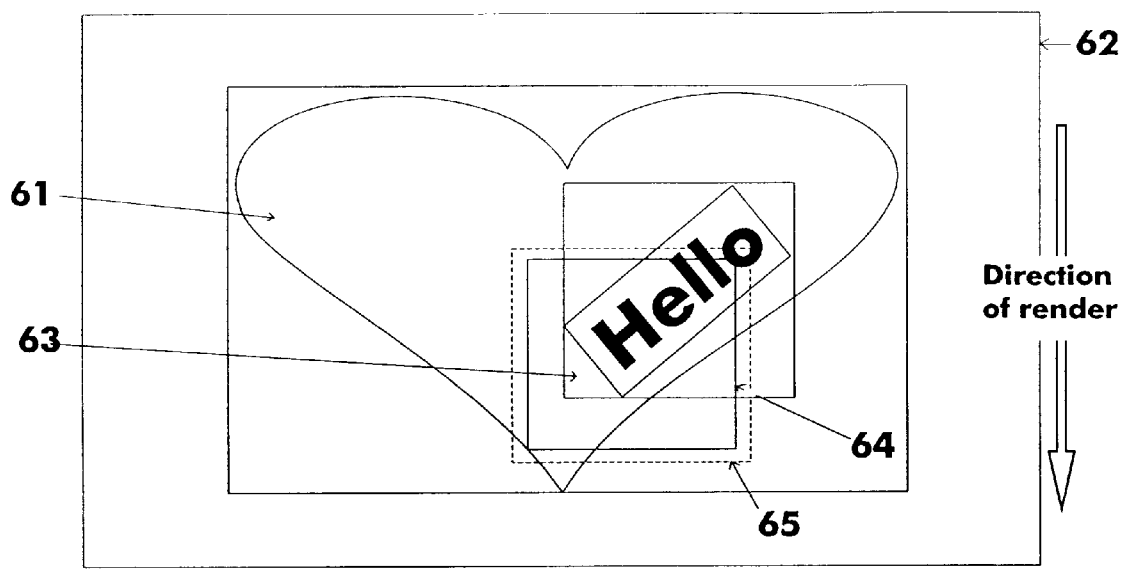
FIG. 4 is a depiction of a rendered image having a "look around" object.
Figure 5:
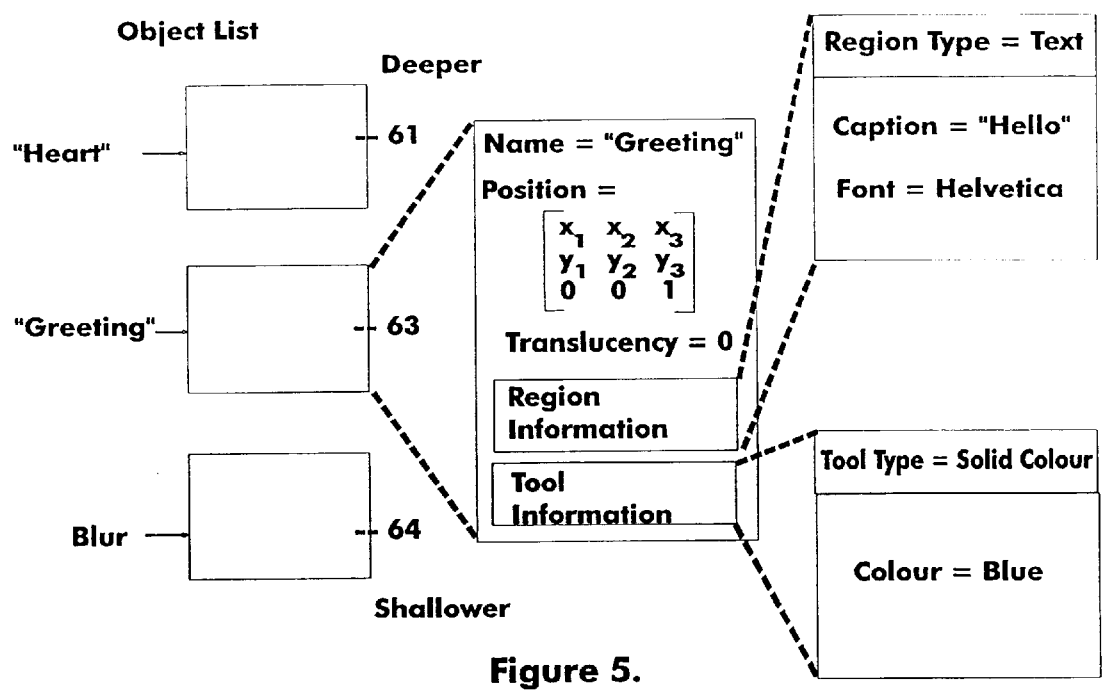
FIG. 5 illustrates the list of objects associated with the image of FIG. 4.

FIG. 4 shows an image 62 which includes the earlier "heart" object 61 and "Greeting" object 63 used in FIG. 1 with "blur" object 64 being added and which is a "look around" object. The object list is shown in FIG. 5. Object 64 is a rectangle region with a "blur" tool, which in this case will require three scanlines of lower objects to allow its effects to be determined. (To "blur" a given point requires information about the points around it, as indicated by area 65.)

Figure 6:
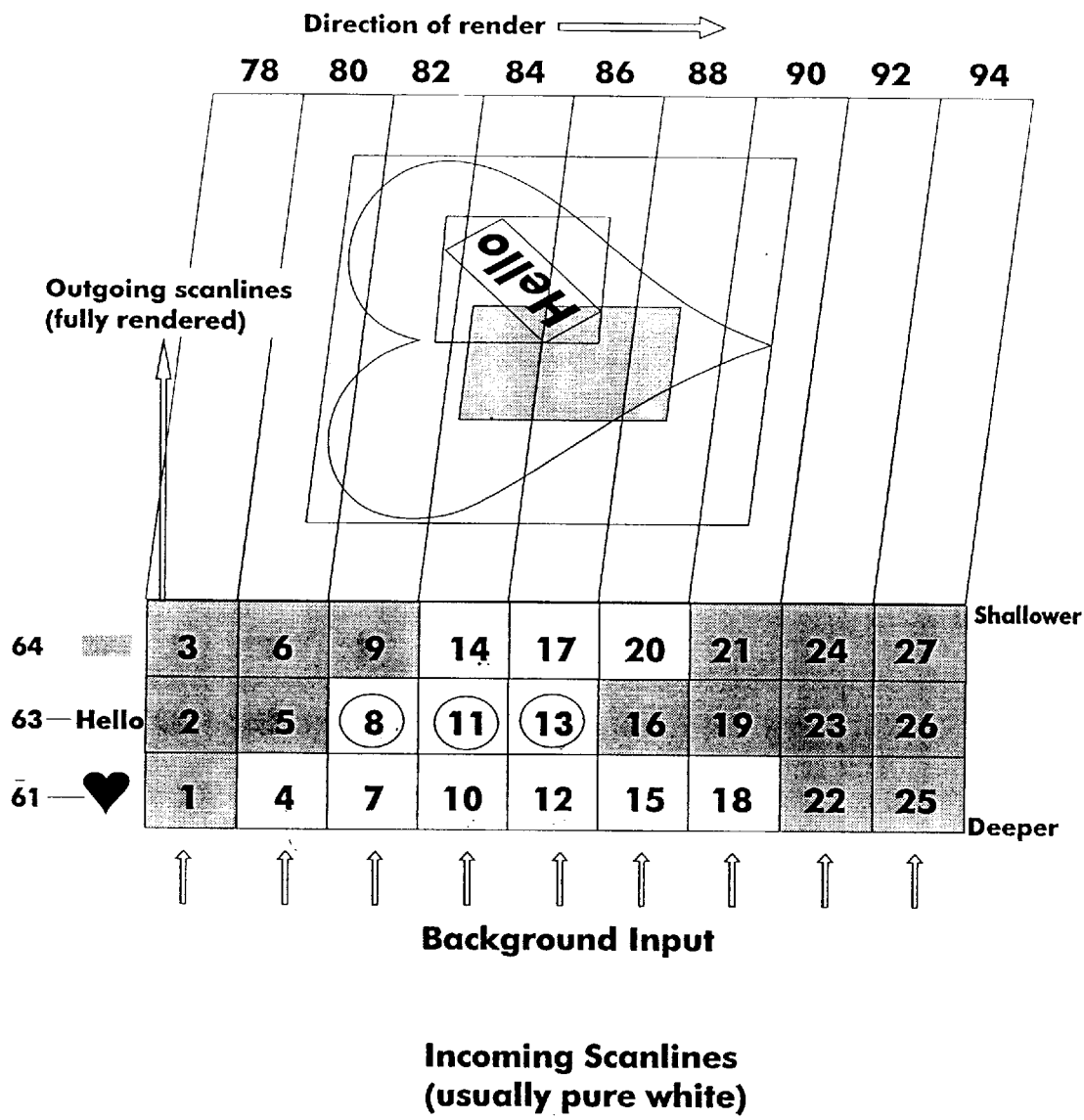
FIG. 6 is a depiction showing how various objects are used by the render engine to produce the image of FIG. 4.

FIG. 6 shows the sequencing steps for producing scanlines for the image of FIG. 4. As with FIG. 1, scanline 78 (the first scanline) (steps 1, 2, 3) is able to be returned as well as scanline 80 (steps 4, 5, 6) by looping through the objects. Scanline 82 is able to go through the first two objects (steps 7 and 8), and the "blur" object 64 at step 9 then recognizes it will require the output at step 8 to eventually return scanline 84. The circle about step 8 indicates the "blur" has maintained a temporary copy of what step 8 provided thereto for its future use. Scanline 82 is returned at step 9. The procedure then returns to the beginning of scanline 84 and step 10 applies the "heart" object and step 11 applies the "greeting" object. This result is provided to the "blur" object which temporarily stores the result indicated by the circle about step 11. The "blur" is stalled as scanline 84 cannot be returned. In order to return scanline 84, the "blur" requires the result of steps 8, 11 and 13. Step 13 is yet to be determined.

Step 12 considers the "heart" object and step 13 considers the "greeting" object. Step 13 allows the "blur" object to output scanline 84 (step 14) Step 14 will overwrite the result of step 11 required by the blur object. Therefore prior to step 14 a temporary copy of the result of step 11 is made for the blur object (indicated by the circle about 11). The procedure returns to the lowest object at step 15. At step 16, the "greeting" object is now complete and the result of steps 15 and 16 is passed to the "blur" which at step 17 returns scanline 86. Before step 17, the results of step 13 are maintained in temporary storage for the blur indicated by the circle about 13. The result of step 16 is still available for use at step 20. At step 18, the "heart" object is rendered, step 19 is complete as "HELLO" has ended. This then allows scanline 88 to be returned at step 20 and scanline 90 at step 21 as the "blur" is now complete. Steps 22 through 27 are straightforward as all objects have no effect and scanlines 92 and 94 are sequentially returned.

From the above, it can be seen that partial results are processed by the objects as required to return a scanline. Memory storage is reduced and confined to "look around" objects. For each scanline, the appropriate portions of objects are considered. Memory used for temporary copies are reused once their purpose has finished (i.e., no longer required by the object). Only those portions of the objects required to render a scanline of the objects above are actually rendered. This may require rendering of different number of scanlines of the objects with the deepest object always having the most rendered scanlines at any one point in time. This typically decreases as you progress up through the objects.

Pseudocode is shown in FIGS. 7 through 10 and illustrates the various steps used in rendering scanlines of the image based on partial consideration of objects.

The pseudocode comprises three main procedures, namely initialization of the objects to be rendered (Render-Init), rendering the objects on a scanline by scanline basis (Render-Stage) and releasing used memory resources after the rendering is complete (Render-Term).

The initialization routine is described in FIG. 7. The Render-Init routine performs the following calculations on every object that exists, namely: determine the object's position in the world coordinate space, then determine if any portion of the object is within the output region, and if so, determine any applicable look around region for the object. Render-Init also calculates the required resultant input region necessary to render the image within the render area. The information regarding what objects must be rendered and the input region is retained for use by other routines.

The rendering routine, Render-Stage, is described in FIG. 8. The rendered region is segmented into scanlines. The routine considers each scanline in turn. Further, for each scanline, each object is considered in order of its ranking, from lowest to highest. If the current scanline does not contain the current object, the next highest object is considered. Otherwise, if the current object does not require additional adjacent scanlines to render its look-around effect, then its current scanline is rendered. However, if the current object does require additional scanlines, the scanline is stalled. Information of all scanlines of object beneath the stalled scanline is then stored in memory. Next, the routine attempts to render as many scanlines as possible when it considers a stalled object. As that scanline for the object has been considered, the next highest object is considered. After all the objects of the current scanline have been considered, the next scanline is analyzed. The procedure is repeated until all objects in all scanlines have been considered.

Herein is the concept of stages. A stage is a section of the image which has been rendered. When there are no look around effects to consider, a stage consists of one scanline. However, when a stage involves stalled objects, multiple scanlines are calculated as the stall clears. Therefore a stage consists of a plurality of rendered scanlines, the number depending on the look around effects of the rendered images.

The final routine is the Render-Term shown in FIG. 9. Its function is to release all temporary memory resources acquired by the program during the Render-Init and Render-Stage routines.

FIG. 10 is an example of the use of the three procedures to render an image.

Figure 11:
FIG. 11 is a photocopy of an image having a bitmap of a photograph of a cat defined as one object of the image.

FIG. 11 illustrates a typical output of the render engine. The information contained in the picture of that cat, as a colour bit-map requires approximately 18 megabytes of memory. The render engine uses stored cat object. The render engine program and the operating system of the computer require an additional 10 megabytes. Therefore, to render the image with the render engine, the computer system memory requirements total approximately 28 megabytes. This image can therefore be rendering completely within a computer with 32 megabytes of memory, without having to access slower, secondary storage to process the rendering. However, if the rendering was performed on current rendering systems, the bit-map of the cat and an additional bit-map of the output image for a high resolution output device (for FIG. 10 this required about 21 megabytes) have to be stored. Therefore the system requirements for the storing and processing the image by itself would be approximately 39 megabytes. Assuming that the current rendering systems also require approximately 10 megabytes for the program and the operating system, the total memory requirements to render the image using only the primary memory of the computer would be 49 megabytes.

The memory advantage of the present procedure increases as the resolution of the output device increases and colour requirements increase. This advantage is achieved while full object independence is maintained.

"Look around" objects require lower objects to pass on their output for certain adjacent scanlines before the "look around" object can render a scanline. In FIG. 4 the blur object required three scanlines from lower objects. The "look around" object makes itself temporary copies of any necessary information that will otherwise be lost before the "look around" object can render. "Look around" objects cause lower objects to continue the process of rendering a scanline in their normal manner and pass the output to the next object until these lower objects have produced the required information for the "look around" object to produce a scanline which then passes this to the next highest object. Return of a scanline causes the lowest object to render its next scanline. In this way, objects can be working on different scanlines. A "look around" object causes objects thereabove to be developed until the "look around" object has the required information to output a scanline.

The objects have been described as still objects, but this procedure can also be used for motion objects such as video images.

The characteristics of the preferred embodiment of the invention include:

1) ease in manipulation of the image as all objects remain fully changeable irrespective of other objects;
2) relatively low memory requirements due to scanline by scanline rendering and use of vector based objects;
3) actual resolution determined by the output devices when an image is rendered;
4) objects can use the results of earlier objects as input to apply the object effect to all objects therebelow;
5) complex special effects are easily implemented; and
6) ease of expansion due to additional tools used by the various regions. Additional regions can be paired with the various tools.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method of rendering the scanlines of an image to an output device which image comprises a plurality of separate and distinct ordered objects and the scanlines of an image are produced by accumulating the rendering effect of portions of said objects in the order of the objects on each scanline, said method comprising, defining each object as a region and a tool to allow determination of the rendering effect of the object by a render engine and in a manner to allow determination of the portion of each object required for returning any scanline of the image, using the region and tool definition of said ordered objects to cause lower ranked objects to produce an accumulated rendering effect of the portions of the lower ranked objects necessary for higher ranked objects to return a scanline of the image and wherein at least some of said objects are interactive objects having tools which require the net rendering effect of a portion of a lower ranked object corresponding to at least several scanlines as an input necessary for producing the net rendering effect of the interactive object on a scanline of the image, and repeatedly using said render engine to sequentially return the scanlines of the image, each scanline of the image being returned by the render engine after accumulating the net rendering effect of said portions of said ordered objects associated with the particular scanline.

2. A method as claimed in claim 1 wherein said render engine applies the rendering effect of the object to only a segment of the scanline which the object affects.

3. A method as claimed in claim 2 wherein said method includes defining a resolution for each object which can vary from the resolution of other objects and said method renders each object at the best resolution for imparting the rendering effect of the object to each segment of a scanline which the object affects.

4. A method as claimed in claim 3 including carrying out said method using a computer.

5. A method as claimed in claim 1 wherein any region may be combined with any tool for defining an object.

6. A method as claimed in claim 1 wherein at least one of said objects includes a bitmap stored as a tool which is applied to the region of the object.

7. A method as claimed in claim 1 wherein the output device has a maximum resolution and each object has its own resolution determined when inputted and at least some of said objects have different inputted resolutions, said method including rendering each object at the best resolution for the output device.

8. A method as claimed in claim 7 wherein the best resolution is determined at the time of rendering an image whereby rendering to different output devices having different resolutions automatically adjust for the resolution of the particular output device.

9. A method as claimed in claim 1 wherein objects are independently maintained during and after rendering of an image.

10. A method of rendering scanlines of an image to an output device comprising defining at least 3 separate and distinct ordered objects which collectively define the image, each object being defined by a region and a tool to allow determination of the object's effect on any scanline of the image, using said objects in the order thereof to accumulate their rendering effect on a first group of scanlines of the image without rendering the entirety of each object having an effect on the first group of scanlines, maintaining a temporary copy of the net rendering of effect of lower objects by a higher object if this information is required for rendering of the higher object, and returning said first group of scanlines to the output device, and many times repeating the process of using said objects in the order thereof for subsequent groups of scanlines of the image until all scanlines have been rendered.

11. A method as claimed in claim 10 wherein scanlines of the image are rendered to the output device in groups of less than 5 scanlines.

12. A method as claimed in claim 10 wherein scanlines to the output device are returned one scanline at a time.

13. A method as claimed in claim 10 wherein the rendering effect of an object is only retained in memory until it is no longer required for rendering other scanlines of the image.

14. A method as claimed in claim 10 wherein said ordered objects pass the accumulated effect of lower objects to upper objects before any of the lower objects are fully rendered.

15. A method of rendering scanlines of an image to an output device comprising defining at least 3 separate and distinct ordered objects which collectively define the image, each object being defined to allow determination of the object's effect on any scanline of the image, using said objects in the order thereof to accumulate their rendering effect on a first group of scanlines of the image, and returning said first group of scanlines to the output device, and many times repeating the process of using said objects in the order thereof for subsequent groups of scanlines of the image until all scanlines have been rendered and wherein some of said objects are look around objects requiring the rendering effect from lower objects with respect to several scanlines and causing said lower objects to render the effect for said several scanlines until a scanline of the image is returned.

16. A method as claimed in claim 15 wherein each scanline is outputted to a large format printer.

17. A method as claimed in claim 16 used to form a billboard print or a large format poster.

18. A method as claimed in claim 10 wherein said output device is a large format printer capable of commercial photographic quality.

19. A method of producing an image comprising defining a plurality of separate and distinct objects in a manner that the effect of the object itself on the final image is determinable, linking said objects in an order from a lowest object to an upper object for evaluation on scanlines of the image, providing logic for applying each object to cause the object during application thereof to have lower objects produce sufficient scanlines to define the collective effect of the object and any lower objects on the output scanline, and producing scanlines of the image by applying said objects where each scanline is produced by sequentially applying said objects from the lowest object to the highest object with each object requiring lower objects to produce said sufficient scanlines and said upper object outputting the scanline of the image to an output device.

20. A method of producing an image comprising defining a plurality of separate and distinct objects where each object is defined as a region and a tool and logically linking said objects to provide input scanlines from lower ranked objects required by higher ranked objects to render a scanline of the image, repeatedly producing scan lines of the image by using said linked objects to provide only a limited number of input scanlines from each object to output a particular scanline of the image which limited number of input scanlines from the objects for any one scanline of the image is only a small portion of the total input scanlines produced to render all scanlines of the image.

21. A method of producing an image comprising defining a plurality of separate and distinct objects and on a scanline basis of said image ranking said objects in order for rendering discrete portions of said objects to provide limited input scanlines from lower ranked objects as input scanlines for higher ranked objects, and repetitively rendering a scanline of the image by rendering the discrete portions of said objects which effect the scanline of the image whereby said image is rendered based upon a series of stages where each stage is designed to pass scanlines to the next highest ranked object before fully rendering the object.

22. A method of rendering an image where the image is a collaboration of a plurality of related objects which collectively define the image, said method comprising a) ranking said objects in order of influence such that a higher ranked object require input from lower ranked objects for determining the effect on the image, b) producing an input scan line based on the lowest ranked object, c) providing said input scan line as an input scanline for the next ranked object and using said next ranked object to produce a new input scanline for the next higher ranked object and repeating this step for each of the ranked objects until a scan line of the final image can be rendered or a ranked object becomes stalled and can not produce its input scanline until at least one additional input scanline from lower ranked objects is additionally provided thereto, d) in the event of a stalled object returning to the lowest ranked object and generating the next input scanline and repeating the process until the stalled object has sufficient input scanlines to allow the stalled object to produce its input scanline for the next ranked object or said scanline of the final image, said method being carried out such that said final image is rendered in discrete stages of said objects based on input scanlines from only portions of said objects which input scanlines are only a small portion of the input scanlines from all objects required for rendering the entire final image.

* * * * *